United States Patent
Shimura et al.

(10) Patent No.: US 8,079,216 B2
(45) Date of Patent: Dec. 20, 2011

(54) ACTUATOR FOR AUTOMOBILES

(75) Inventors: Takashi Shimura, Toyota (JP); Atsushi Nakagaki, Nagoya (JP); Hiroki Ozaki, Gamagoori (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 497 days.

(21) Appl. No.: 12/227,071

(22) PCT Filed: May 30, 2007

(86) PCT No.: PCT/IB2007/002200
§ 371 (c)(1),
(2), (4) Date: Nov. 6, 2008

(87) PCT Pub. No.: WO2007/138480
PCT Pub. Date: Dec. 6, 2007

(65) Prior Publication Data
US 2009/0158731 A1    Jun. 25, 2009

(30) Foreign Application Priority Data
May 31, 2006  (JP) ................................ 2006-151344

(51) Int. Cl.
*F02D 23/00* (2006.01)
(52) U.S. Cl. ........................................................ 60/602
(58) Field of Classification Search ................. 60/602
See application file for complete search history.

(56) References Cited

U.S. PATENT DOCUMENTS

| | | | |
|---|---|---|---|
| 4,254,625 A | 3/1981 | Bergstedt et al. | |
| 4,354,465 A | 10/1982 | Takeuchi et al. | |
| 5,152,145 A | 10/1992 | Miotke et al. | |
| 5,701,741 A * | 12/1997 | Halsall | ............................. 60/602 |
| 2004/0016233 A1 | 1/2004 | Natali | |
| 2005/0239554 A1* | 10/2005 | Wang | .............................. 464/17 |

FOREIGN PATENT DOCUMENTS

| | | |
|---|---|---|
| JP | U-64-34854 | 3/1989 |
| JP | U-5-42711 | 6/1993 |
| JP | U-5-50963 | 7/1993 |
| JP | A-7-9950 | 1/1995 |

(Continued)

OTHER PUBLICATIONS

Japanese Office Action dated Apr. 2, 2009 issued in Japanese Patent Application No. 2006-151344 (with translation).

(Continued)

*Primary Examiner* — Thomas Denion
*Assistant Examiner* — Michael Carton
(74) *Attorney, Agent, or Firm* — Oliff & Berridge, PLC (57) ABSTRACT

An actuator for automobiles has a housing in which a communication channel for ventilation is formed, the communication channel allowing the inside and the outside of the housing to communicate with each other. Only one communication channel is formed, and the communication channel has an ascending portion that increases in height toward the inside of the housing. The ascending portion is formed so that a vertically lowermost point of the end (a second opening) of the ascending portion on the inner side of the housing is positioned higher than an uppermost point of the end (a first opening) of the ascending portion on the outer side of the housing. With such a configuration, condensation in the housing is minimized, and the risk of malfunction due to entrance of water is minimized.

10 Claims, 5 Drawing Sheets

FOREIGN PATENT DOCUMENTS

| | | | |
|---|---|---|---|
| JP | A-7-103116 | | 4/1995 |
| JP | 05-042711 | * | 5/1995 |
| JP | A-10-94209 | | 4/1998 |
| JP | A-2004-176602 | | 6/2004 |
| JP | A-2004-350458 | | 12/2004 |
| JP | A-2005-256691 | | 9/2005 |

OTHER PUBLICATIONS

Japanese Office Action dated Nov. 24, 2010 issued in Japanese Patent Application No. 2006-151344 (with partial translation).

Office Action issued in Japanese Application No. 2006-151344 dated Jan. 11, 2011 (with translation).

* cited by examiner

ACTUATOR FOR AUTOMOBILES

INCORPORATION BY REFERENCE

The disclosure of Japanese Patent Application No. 2006-151344 filed on May 31, 2006, including the specification, drawings and abstract is incorporated herein by reference in its entirety.

BACKGROUND OF THE INVENTION

1. Field of the Invention

The present invention relates to an actuator for automobiles.

2. Description of the Related Art

As a turbocharger for enhancing air intake efficiency of an internal combustion engine for automobiles, an exhaust gas-driven turbocharger that uses the flow of exhaust gas for supercharging is already available. The turbocharger includes a compressor wheel disposed in an air intake passage, and a turbine wheel, which is disposed in an exhaust passage, and rotates integrally with the compressor wheel. In the turbocharger having such a configuration, exhaust gas in the exhaust passage is introduced to the turbine wheel, thereby rotating the turbine wheel. The compressor wheel rotates with the rotation of the turbine wheel, thereby increasing the intake pressure (boost pressure) in the intake passage. As a result, it is made possible to forcibly introduce the intake air with high boost pressure into combustion chambers of the internal combustion engine, so that it is possible to enhance air intake efficiency of the internal combustion engine.

In order to prevent an excessive increase in boost pressure, an internal combustion engine provided with such a turbocharger generally has a bypass line for bypassing the turbine wheel provided on an exhaust line, and includes a wastegate for opening and closing the bypass line. An electrically-operated actuator for driving the wastegate is connected to the wastegate. When the boost pressure becomes equal to or higher than a predetermined pressure, part of the exhaust gas to be introduced to the turbine wheel is introduced into the bypass line by controlling driving of the actuator so as to open the bypass line. By introducing part of the exhaust gas to be introduced to the turbine wheel into the bypass line in this way, an excessive increase in the number of revolutions of the turbine wheel and the compressor wheel is prevented so that an excessive increase in boost pressure is avoided.

In a housing of the electrically-operated actuator as described above, a plurality of communication holes that allow the inside and the outside of the housing to communicate with each other are formed so as to ensure the ventilation of the inside of the housing. By ensuring the ventilation of the inside of the housing in this way, it is made possible to minimize condensation in the housing.

However, given that such communication holes are provided in the housing, when the automobile runs across a river, and the actuator is immersed into water, such a problem as described below cannot be treated lightly. Specifically, under the conditions in which the actuator is immersed into water, water enters the housing through the communication holes formed in the housing, which can cause a malfunction of the actuator.

Examples of such actuators include the actuator described in Japanese Utility Model Application Publication No. 5-42711 (JP-U-5-42711). In this actuator, a communication hole that allows the inside and the outside of the housing of the actuator communicate with each other is provided. Thus, when the actuator is immersed into water, water enters the housing, which can cause a malfunction of the actuator.

Other actuators of an internal combustion engine also have substantially the same problem in common that there is a possibility that an actuator malfunctions when the actuator is immersed into water, and water enters the housing. For example, the turbocharger described in Japanese Patent Application Publication No. 2005-256691 (JP-A-2005-256691) is provided with a movable vane for varying the flow rate of exhaust gas. The actuator for driving this movable vane also has a similar problem.

SUMMARY OF THE INVENTION

The present invention has been made in consideration of the above circumstances, and provides an actuator for automobiles that has a housing with which condensation in the housing is minimized, and the risk of malfunction of the actuator due to entrance of water is minimized.

An aspect of the present invention provides an actuator for an automobile, in which a driving mechanism is housed in a housing, and ventilation of the actuator is achieved only through a communication channel that allows an inside and an outside of the housing to communicate with each other, the actuator being characterized in that: only one communication channel is formed, and the communication channel has an ascending portion that increases in height toward the inside of the housing; and the ascending portion is formed so that a vertically lowermost point of an inner-side end, positioned on the inner side with respect to the housing, of the ascending portion is positioned higher than an uppermost point of an outer-side end, positioned on the outer side with respect to the housing, of the ascending portion.

According to this configuration, because only one communication channel for ventilation is formed, when the actuator is immersed into water, water tries to enter the actuator only through the communication channel. The communication channel has the ascending portion that increases in height toward the inside of the housing, and the communication channel is formed so that the vertically lowermost point of the end of the ascending portion on the inner side of the housing is positioned higher than the uppermost point of the end of the ascending portion on the outer side of the housing. Thus, when the water level reaches the uppermost point of the end of the ascending portion on the outer side of the housing, water is prevented from further entering the housing by virtue of air pressure in the housing. Under normal conditions, it is possible to minimize condensation in the housing by ventilation through the communication channel for ventilation. As a result, it is possible to minimize condensation in the housing, and at the same time, to minimize the risk of malfunction of the actuator due to entrance of water.

In the actuator for automobiles, the communication channel may consist of the ascending portion; and the ascending portion may be formed so that a vertically lowermost point of an inner-side opening, positioned on the inner side with respect to the housing, of the communication channel is positioned higher than an uppermost point of an outer-side opening, positioned on the outer side with respect to the housing, of the communication channel.

In this configuration, the communication channel is made up of the ascending portion only, and the ascending portion is formed so that the vertically lowermost point of the opening located on the inner side of the housing is higher than the uppermost point of the opening located on the outer side of the housing. Accordingly, even when the actuator is immersed into water, and water enters the communication channel, the water is discharged from the communication channel under the action of gravity after the actuator gets out of water. As a result, it is possible to improve the drainage characteristics of the communication channel.

In the actuator for automobiles, the outer-side opening, positioned on the outer side with respect to the housing, of the communication channel may be open toward a central area of the automobile.

According to this configuration, because the opening of the communication channel located on the outer side of the housing is open toward the central area of the automobile, it is possible to minimize entrance of water into the communication channel and the housing even under conditions in which water splashes toward the central area of the automobile, such as during car washing.

The opening may be open toward a laterally central area of the automobile. According to this configuration, because the opening of the communication channel located on the outer side of the housing is open toward the laterally central area of the automobile, it is possible to minimize entrance of water into the communication channel and the housing even under conditions in which water splashes toward the laterally central area of the automobile, such as during car washing.

The opening may be open toward the rear of the automobile. According to this configuration, because the opening is open toward the rear of the automobile, it is difficult for water to reach the opening during normal forward traveling of the automobile, and it is therefore possible to minimize entrance of water into the housing.

In the actuator for automobiles, the communication channel may have the ascending portion formed in a linear shape.

This configuration offers an advantage in that formation of the communication channel is easy and it is therefore possible to reduce cost. In addition, it is possible to minimize entrance of water into the actuator, and to minimize condensation in the housing.

In the actuator for automobiles, the communication channel may have a plurality of the ascending portions formed in a zigzag shape.

According to this configuration, entrance of water is further minimized by virtue of the zigzag ascending portion. Thus, it is possible to further minimize entrance of water into the actuator, and to minimize condensation in the housing.

In the actuator for automobiles, the communication channel may have the ascending portion formed in a curved shape.

According to this configuration, it is made easy to prevent water from entering the actuator by virtue of the curved ascending portion. Thus, it is possible to minimize entrance of water into the actuator, and to minimize condensation in the housing.

The actuator for automobiles may be an electrically-operated actuator for performing opening and closing of a movable vane, which is used to regulate a flow rate or a flow speed of exhaust gas to be introduced to a turbine wheel of a turbocharger, or opening and closing of a wastegate of a turbocharger.

In general, turbochargers are provided with actuators for driving a wastegate and a movable vane. When these actuators are electrically-operated actuators, condensation is a serious problem. Thus, the communication hole for ventilation that allows the inside and the outside of the housing to communicate with each other is formed in the housing of the actuator to prevent condensation. In addition, it is often the case that such actuators are disposed at relatively lower positions of an automobile. For this reason, when the automobile runs across a river, the actuator is highly likely to be immersed into water. Accordingly, when the present invention is applied to an electrically-operated actuator for performing the opening and closing of the movable vane, which is used to regulate the flow rate or the flow speed of the exhaust gas to be introduced to the turbine wheel, or the opening and closing of the wastegate for turbochargers, a particularly remarkable result can be expected.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

In the following description and the accompanying drawings, the present invention will be described in more detail with reference to exemplary embodiments.

An embodiment in which an actuator for automobiles according to the present invention is embodied as an actuator for opening and closing operation of a movable vane, which is used to regulate the flow rate or flow speed of exhaust gas to be introduced to a turbine wheel of a turbocharger for engines, will be described with reference to FIGS. 1 to 3.

Figure 1:
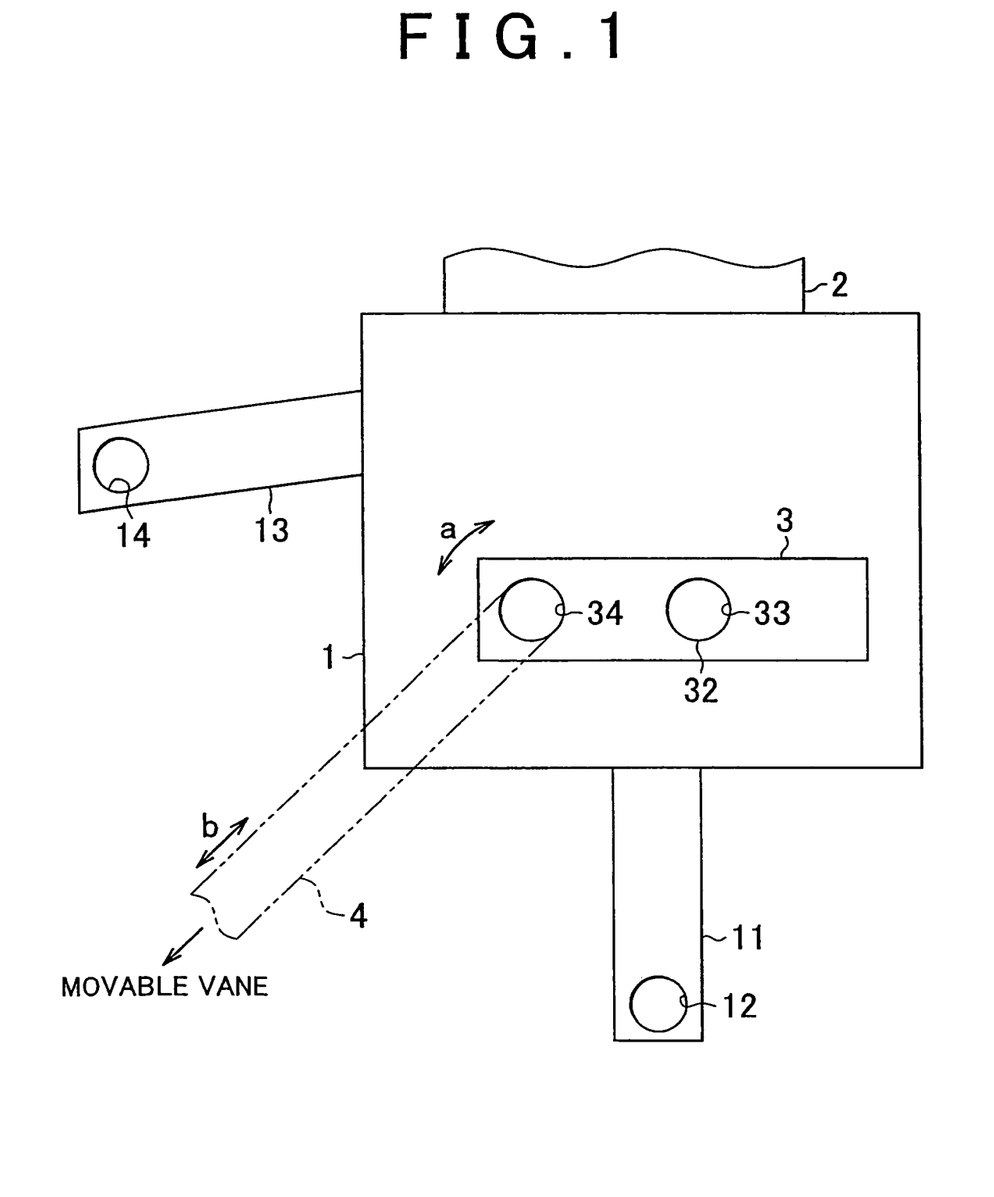
FIG. 1 is a front view showing a configuration of an embodiment of an actuator for automobiles according to the present invention.

As shown in FIG. 1, a first protrusion 11 and a second protrusion 13 are formed on the lower surface and the left-side surface of a housing 1 of the actuator, respectively. A first through hole 12 and a second through hole 14 are formed in the first protrusion 11 and the second protrusion 13, respectively. A bolt is passed through each of the first and second through holes 12 and 14, and the actuator is fixedly fastened to the turbocharger with the bolts.

On the upper surface of the housing 1, a motor 2 for driving the actuator is disposed. A seal member is disposed between the housing 1 and the motor 2, preventing water, oil, etc. from flowing from the outside into the actuator.

A first rotary shaft 32 protruding from the front surface of the housing is provided at a central portion of the housing 1. The first rotary shaft 32 is rotated using the output torque from the motor 2 as the driving force. In addition, a rectangular rotary plate 3 is provided at a central portion of the housing 1. A first through hole 33 is formed in a central portion of the rotary plate 3, and the first rotary shaft 32 is inserted into the first through hole 33 and fixed thereto. Thus, the rotary plate 3 integrally rotates with the first rotary shaft 32. A second through hole 34 is formed in an end portion of the rotary plate 3. An end of an arm 4, which is connected to the movable vane of the turbocharger, is fitted into the second through hole 34.

It should be noted that a seal member is disposed at each gap of the motor 2 to prevent water, oil, etc. from entering from the outside into the motor 2.

Next, details of the internal structure of the actuator according to this embodiment will be described with reference to FIGS. 2 to 5. An insertion hole 21, which runs from the inside of the motor 2 to the lower surface thereof, is formed in the motor 2. A second rotary shaft 22, which is rotated by the output torque from the motor 2, is passed through the insertion hole 21. A pinion 23 is provided at the tip of the second rotary shaft 22. The second rotary shaft 22 and the pinion 23 integrally rotate.

An accommodating hollow 15, which is open at the upper surface of the housing 1, is formed in the housing 1. In the accommodating hollow 15, the pinion 23 and a reduction gear 41, which engages with the pinion 23, are disposed. Thus, the second rotary shaft 22 of the motor 2 is connected to a third rotary shaft 42 through the pinion 23 and the reduction gear 41.

An insertion hole 16, which is open to the accommodating hollow 15 at the bottom of the accommodating hollow 15, is formed in the housing 1. The third rotary shaft 42 is inserted into the insertion hole 16. One end of the third rotary shaft 42 is joined to the reduction gear 41, and the other end thereof is rotatably supported at the bottom of the insertion hole 16. A worm gear 43 is provided at a central portion of the third rotary shaft 42.

An internal hollow 17, which has a substantially semicircular cross section, is formed in the housing 1. The second protrusion 13-side of the internal hollow 17 is open to the insertion hole 16 at a middle portion of the insertion hole 16. A semicircular worm wheel 44 is disposed in the internal hollow 17. The worm wheel 44 engages with the worm gear 43. The worm wheel 44 and the worm gear 43 constitute a worm gear train.

Figure 3:
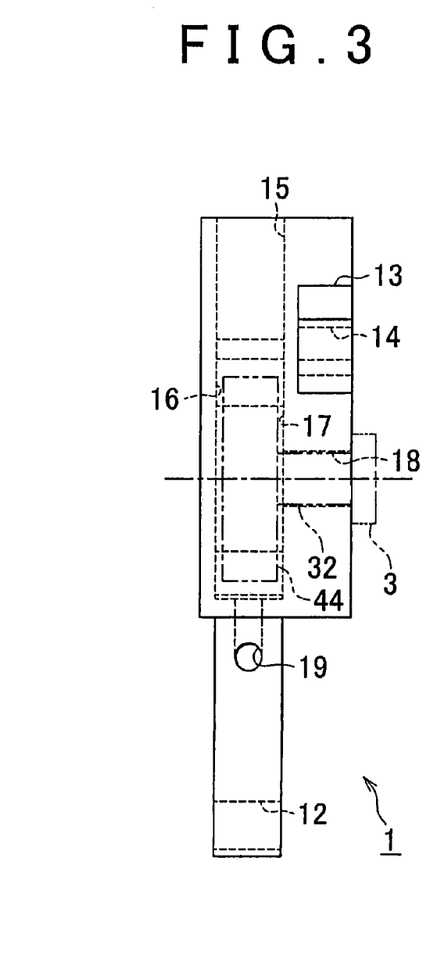
FIG. 3 is a side view showing the configuration of a housing of the actuator show in FIG. 1.
Figure 4:
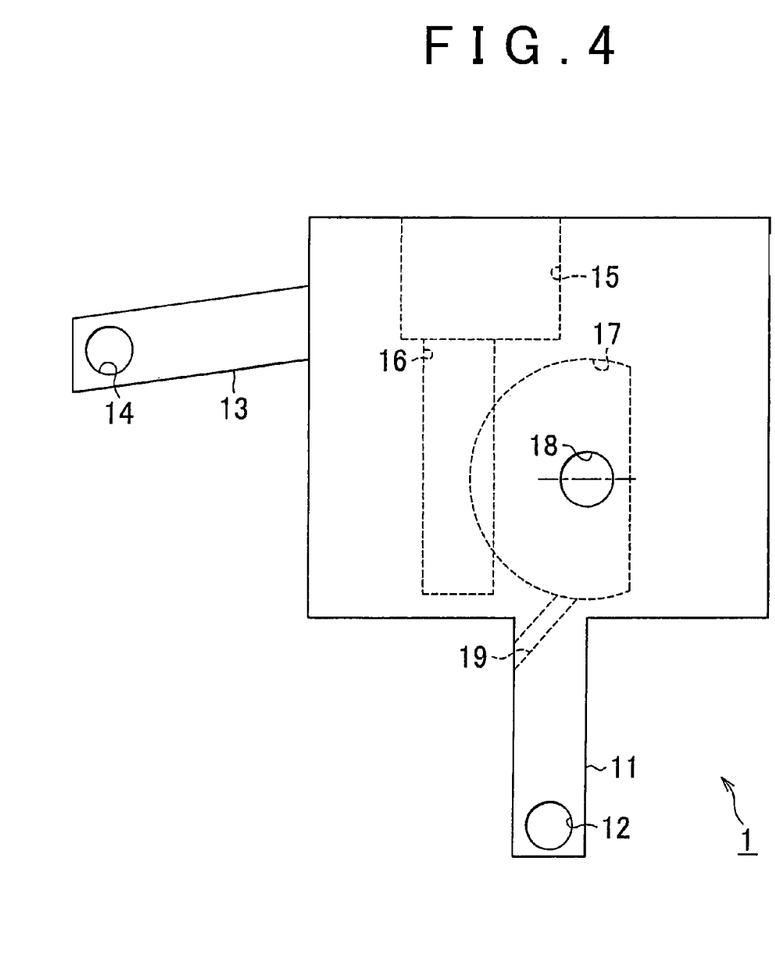
FIG. 4 is a front view showing the configuration of the housing of the actuator shown in FIG. 1.

As shown in FIGS. 3 and 4, a through hole 18 that runs from a central portion of a side wall of the internal hollow 17 to the front surface of the housing 1 (the surface on which the rotary plate 3 is disposed) is formed in the housing 1. The first rotary shaft 32 is passed through the through hole 18. One end of the first rotary shaft 32 is inserted into the first through hole 33 of the rotary plate 3 and fixed thereto, and the other end thereof is fixedly joined to the worm wheel 44 at the rotational center of the worm wheel 44. The first rotary shaft 32 is connected to the third rotary shaft 42 through the worm wheel 44 and the worm gear 43. A seal member is disposed at a gap between the through hole 18 and the first rotary shaft 32 to prevent water, oil, etc. from flowing from the outside into the housing 1.

As described above, in the actuator according to this embodiment, a driving mechanism constituted of the motor 2, the first rotary shaft 32, the second rotary shaft 22, the third rotary shaft 42, the reduction gear 41, the worm gear 43 and the worm wheel 44 is housed.

Figure 2:
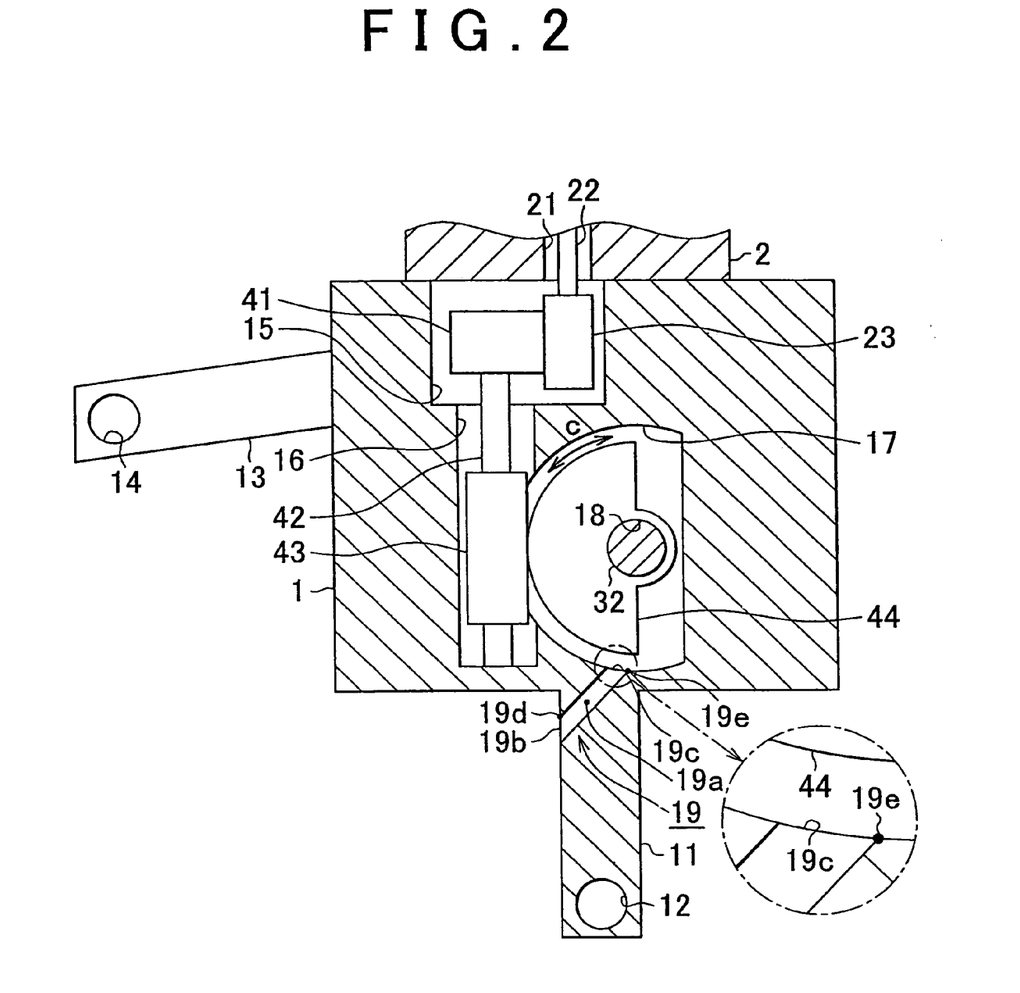
FIG. 2 is a sectional view showing the configuration of the actuator show in FIG. 1.

As shown in FIG. 2, a communication channel 19 that runs from the bottom of the internal hollow 17 to the left-side surface of the first protrusion 11 is formed in the housing 1. The communication channel 19 has an ascending portion 19a that is formed in a linear shape so as to increase in height toward the inside of the housing 1. The ascending portion 19a has a first opening 19b at the end of the ascending portion 19a on the outer side of the housing 1, and has a second opening 19c at the end of the ascending portion 19a on the inner side of the housing 1. The ascending portion 19a is formed so that a vertically lowermost point 19e of the end of the ascending portion 19a on the inner side of the housing 1 is positioned higher than an uppermost point 19d of the end of the ascending portion 19a on the outer side of the housing 1. The first opening 19b of the communication channel 19 located on the outer side is open toward the central area of the automobile in which various machines, such as an engine, a transmission, etc. are disposed. The first opening 19b may be open toward the laterally central area. Alternatively, the first opening 19b may be open toward the rear of the automobile.

In the actuator according to this embodiment, the inside and the outside of the housing 1 communicate with each other only through the communication channel 19. Accordingly, the communication channel 19 functions as a passage for ventilation, and the ventilation between the inside and the outside of the housing 1 is achieved through the communication channel 19.

Next, a manner in which the actuator according to this embodiment is driven will be described with reference to FIGS. 1 and 2. As shown in FIG. 2, when the second rotary shaft 22 is rotated by the output torque from the motor 2, the torque is transmitted to the third rotary shaft 42 through the pinion 23 and the reduction gear 41. Thus, the third rotary shaft 42 and the worm gear 43 integrally rotate, and the rotation of the worm gear 43 causes the worm wheel 44 to rotate in the direction indicated by the arrow c shown in FIG. 2. The rotation of the worm wheel 44 in turn causes the first rotary shaft 32, which is joined to the worm wheel 44, to rotate. As shown in FIG. 1, the rotation of the first rotary shaft 32 causes the rotary plate 3 to rotate in the direction indicated by the arrow a shown in FIG. 1. The rotation of the rotary plate 3 causes a displacement of the arm 4 in the direction indicated by the arrow b shown in FIG. 1. The displacement of the arm 4 effects the opening and closing operation of the movable vane of the turbocharger.

As described above in detail, according to this embodiment, the effects listed below can be obtained.

(1) Because only one communication channel 19 for ventilation is formed, when the actuator is immersed into water, water tries to enter the actuator only through the communication channel 19. The communication channel 19 has the ascending portion 19a that increases in height toward the inside of the housing 1, and the communication channel 19 is formed so that the vertically lowermost point 19e of the end (the second opening 19c) of the ascending portion 19a on the inner side of the housing 1 is positioned higher than the uppermost point 19d of the end (the first opening 19b) of the ascending portion 19a on the outer side of the housing 1. Thus, when the water level reaches the uppermost point 19d of the end of the ascending portion 19a on the outer side of the housing 1, water is prevented from further entering the housing 1 by virtue of the air pressure in the housing 1. Under normal conditions, it is possible to minimize condensation in the housing 1 by ventilation through the communication channel 19 for ventilation. As a result, it is possible to minimize condensation in the housing 1, and at the same time, to minimize the risk of malfunction of the actuator due to entrance of water.

(2) The communication channel 19 is made up of the ascending portion 19a only, and the ascending portion 19a is formed so that the vertically lowermost point 19e of the second opening 19c located on the inner side of the housing 1 is higher than the uppermost point 19d of the first opening 19b located on the outer side of the housing 1. Accordingly, even when the actuator is immersed into water, and water enters the communication channel 19, the water is discharged from the communication channel 19 under the action of gravity after the actuator gets out of water. As a result, it is possible to improve the drainage characteristics of the communication channel 19.

(3) Because the first opening 19b of the communication channel 19 located on the outer side of the housing 1 is open toward the central area of the automobile, it is possible to minimize entrance of water into the communication channel and the housing 1 even under conditions in which water splashes toward the central area of the automobile, such as during car washing. When the first opening 19b is open toward the laterally central area of the automobile, it is possible to minimize entrance of water into the communication channel and the housing 1 even under conditions in which water splashes toward the central area of the automobile, such as during car washing. When the first opening 19b is open toward the rear of the automobile, it is difficult for water to reach the opening during normal forward traveling of the automobile, and it is therefore possible to minimize entrance of water into the housing.

The above embodiment may be implemented in the following modes that are appropriately altered from the embodiment.

Figure 5:
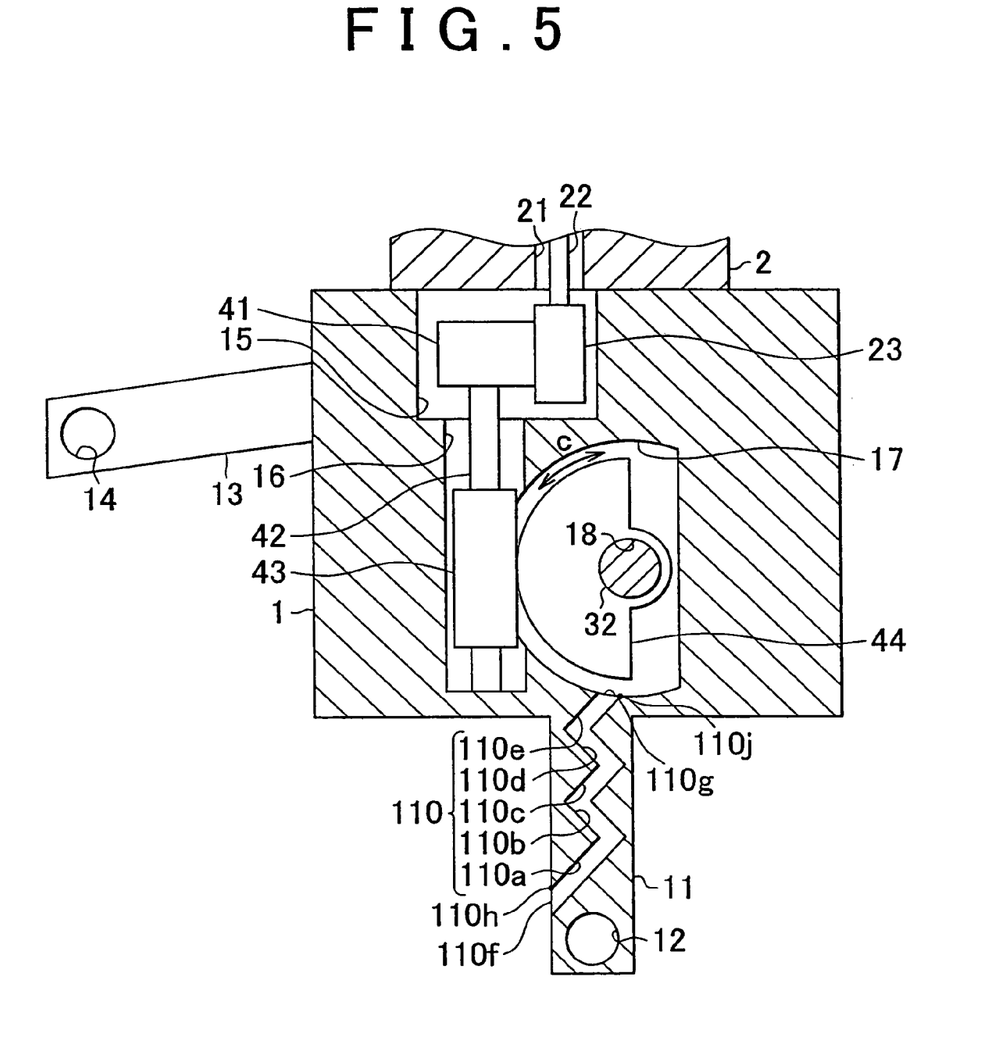
FIG. 5 is a sectional view showing a modification of an actuator for automobiles according to the present invention.

FIG. 5 shows, as a first modification, a communication channel 110 having a plurality of ascending portions. In the communication channel 110, a plurality of ascending portions 110a to 110e are formed in a zigzag shape so that the communication channel 110 increases in height toward the inside of the housing. According to this configuration, even when water rushingly splashes onto the opening (the ascending portion 110a) of the communication channel, the water hits the ascending portions 110a to 110e that are formed in a zigzag shape, and thus, it is possible to further minimize the entrance of water.

In the above embodiment and the first modification, the actuator is constituted of the motor 2, the pinion 23, the worm gear 43, etc. However, the actuator may include other components, such as a diaphragm.

Figure 6:
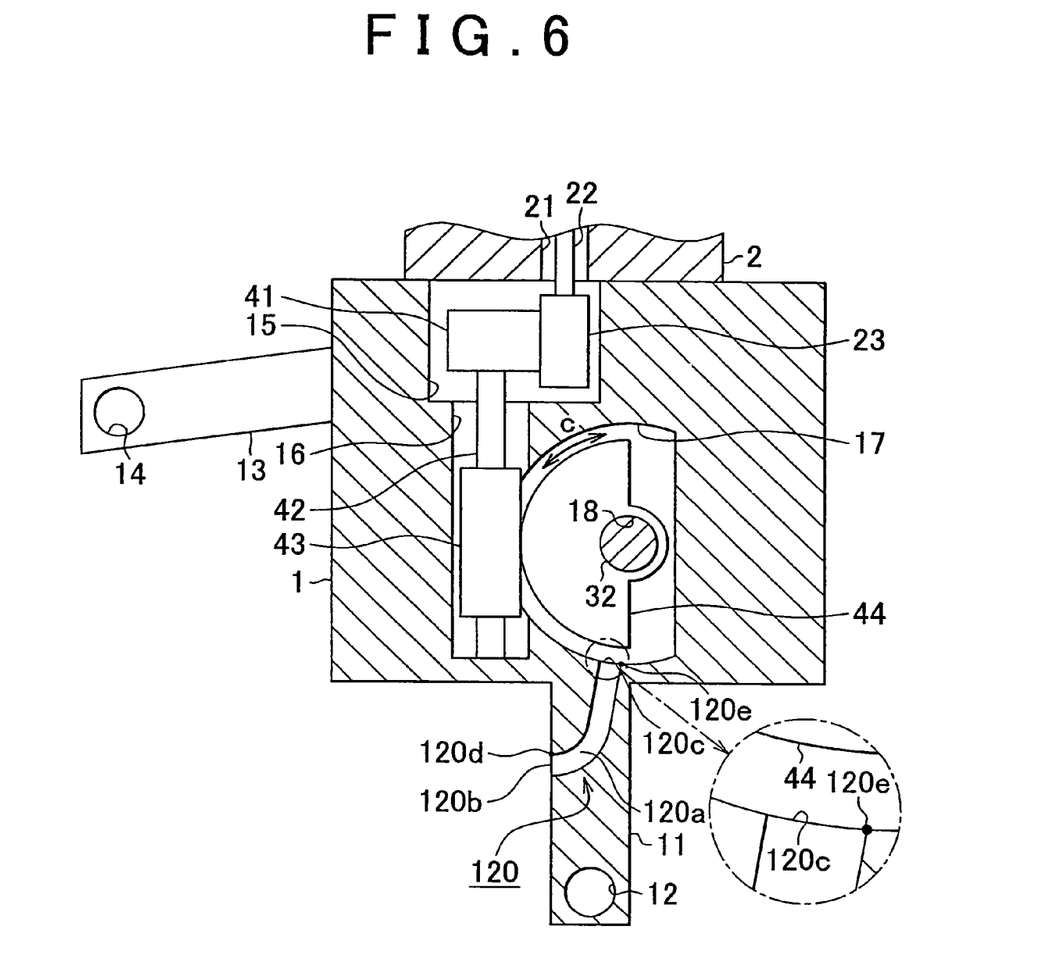
FIG. 6 is a sectional view showing another modification of an actuator for automobiles according to the present invention.

In the above embodiment and the first modification, the communication channel has the ascending portion(s) formed in a linear shape. However, in a second modification shown in FIG. 6, the actuator has an ascending portion 120a that is formed in a curved shape as shown by a communication channel 120.

In the above embodiment, the first modification, and the second modification, the actuator for automobiles according to the present invention is used as the actuator that drives the movable vane of the turbocharger for engines. However, the actuator according to the present invention may be used as another actuator installed in an automobile, such as the actuator for opening and closing a wastegate for turbochargers.

The invention claimed is:

1. An actuator for an automobile, comprising:
   a driving mechanism that is housed in a housing of the actuator, and a communication channel that allows an inside of the housing to communicate with atmosphere by means of the communication channel and only through that ventilation of the actuator is achieved, wherein
   the housing has a protrusion extending downward in a vertical direction;
   only one communication channel is formed so as to extend in the protrusion, and the communication channel has an ascending portion that increases in height toward the inside of the housing, and
   the ascending portion is formed so that a vertically lowermost point of an inner-side end, positioned on the inner side with respect to the housing, of the ascending portion is positioned higher than an uppermost point of an outer-side end, positioned on the outer side with respect to the housing, of the ascending portion.

2. The actuator for an automobile according to claim 1, wherein
   the communication channel consists of the ascending portion, and
   the ascending portion is formed so that a vertically lowermost point of an inner-side opening, positioned on the inner side with respect to the housing, of the communication channel is positioned higher than an uppermost point of an outer-side opening, positioned on the outer side with respect to the housing, of the communication channel.

3. The actuator for an automobile according to claim 1, wherein the outer-side opening, positioned on the outer side with respect to the housing, of the communication channel is open toward a central area of the automobile.

4. The actuator for an automobile according to claim 1, wherein the outer-side opening, positioned on the outer side with respect to the housing, of the communication channel is open toward a laterally central area of the automobile.

5. The actuator for an automobile according to claim 1, wherein the outer-side opening, positioned on the outer side with respect to the housing, of the communication channel is open toward a rear of the automobile.

6. The actuator for an automobile according to claim 1, wherein the communication channel has the ascending portion formed in a linear shape.

7. The actuator for an automobile according to claim 1, wherein the communication channel has a plurality of the ascending portions formed in a zigzag shape.

8. The actuator for an automobile according to claim 1, wherein the communication channel has the ascending portion formed in a curved shape.

9. The actuator for an automobile according to claim 1, wherein the actuator is an electrically-operated actuator for performing opening and closing of a movable vane, which is used to regulate a flow rate or a flow speed of exhaust gas to be introduced to a turbine wheel of a turbocharger, or opening and closing of a wastegate of a turbocharger.

10. The actuator for an automobile according to claim 1, wherein the actuator is an electrically-operated actuator.

* * * * *